US008472348B2

(12) United States Patent
Hui et al.

(10) Patent No.: US 8,472,348 B2

(45) Date of Patent: Jun. 25, 2013

(54) RAPID NETWORK FORMATION FOR LOW-POWER AND LOSSY NETWORKS

(75) Inventors: Jonathan W. Hui, Foster City, CA (US); Jean-Philippe Vasseur, Saint Martin Duriage (FR)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 13/176,275

(22) Filed: Jul. 5, 2011

(65) Prior Publication Data

US 2013/0010615 A1 Jan. 10, 2013

(51) Int. Cl.
*H04L 12/28* (2006.01)

(52) U.S. Cl.
USPC ........... 370/254; 370/401; 370/235; 370/255; 370/256; 370/466

(58) Field of Classification Search
USPC .......................................................... 709/224
See application file for complete search history.

(56) References Cited

U.S. PATENT DOCUMENTS 6,032,194 A 2/2000 Gai et al.
6,170,075 B1 * 1/2001 Schuster et al. .............. 714/776
6,801,506 B1 10/2004 Dey
6,976,088 B1 12/2005 Gai et al.
7,346,773 B2 3/2008 Cam-Winget et al.
7,496,078 B2 2/2009 Rahman
7,502,617 B2 3/2009 Douglas et al.
7,551,578 B2 6/2009 Pollack et al.
7,558,878 B2 7/2009 Kaluve et al.
7,656,936 B2 2/2010 Li et al.
7,870,590 B2 1/2011 Jagadeesan et al.
7,925,729 B2 4/2011 Bush et al.
2007/0143453 A1 * 6/2007 Huang .......................... 709/220
2009/0161581 A1 * 6/2009 Kim .............................. 370/254
2009/0168712 A1 7/2009 Douglas et al.
2009/0304381 A1 * 12/2009 Muppidi et al. ................ 398/34
2010/0058232 A1 3/2010 De Silva
2011/0026414 A1 * 2/2011 Banerjee ....................... 370/252

OTHER PUBLICATIONS

"RPL: IPv6 Routing Protocol for Low Power and Lossy Networks" <draft-ietf-roll-rpl-19> by Winter, at al. (Mar. 13, 2011 version).
"Routing Metrics used for Path Calculation in Low Power and Lossy Networks" <draft-ietf-roll-routing-metrics-19> by Vasseur, et al. (Mar. 1, 2011 version).
"The Minimum Rank Objective Function with Hysteresis" <draft-ietf-roll-minrank-hysteresis-of-03> by O. Gnawali et al. (May 3, 2011 version).
"RPL Objective Function 0" <draft-ietf-roll-of0-11> by Thubert (May 5, 2011 version).
"Compression Format for IPv6 Datagrams in Low Power and Lossy Networks (6LowPAN)" <draft-ietf-6lowpan-hc-15> by Hui et al. (Feb. 24, 2011 version).

* cited by examiner

*Primary Examiner* — Duc C Ho

(74) *Attorney, Agent, or Firm* — Edwards Wildman Palmer LLP; James M. Behmke; Stephen D. LeBarron

(57) ABSTRACT

In one embodiment, a node joins a communication network, and in response to joining the network, operates in a rapid startup mode, wherein the node in rapid startup mode establishes network configurations rapidly by deemphasizing quality (optimality) of the network configurations. Subsequent to operating in the rapid startup mode (e.g., after some timer or explicit command), the node then operates in a robust mode, wherein the node in robust mode iteratively refines the network configurations to increase the quality of the network configurations.

25 Claims, 14 Drawing Sheets

RAPID NETWORK FORMATION FOR LOW-POWER AND LOSSY NETWORKS

TECHNICAL FIELD

The present disclosure relates generally to computer networks, and, more particularly, to network formation for low-power and lossy networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One cumbersome feature of certain LLNs today is their network formation time, both for cold-start and warm-start network formation scenarios. In either case, the network formation time is generally based on the amount of time it takes for all LLN devices to begin communicating with necessary application end-points. However, due to the often high numbers of nodes, and the low speed and quality of the links in an LLN, the network formation time can be rather lengthy. For example, for these reasons, properly building a stable network topology can take tens of minutes, if not hours.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
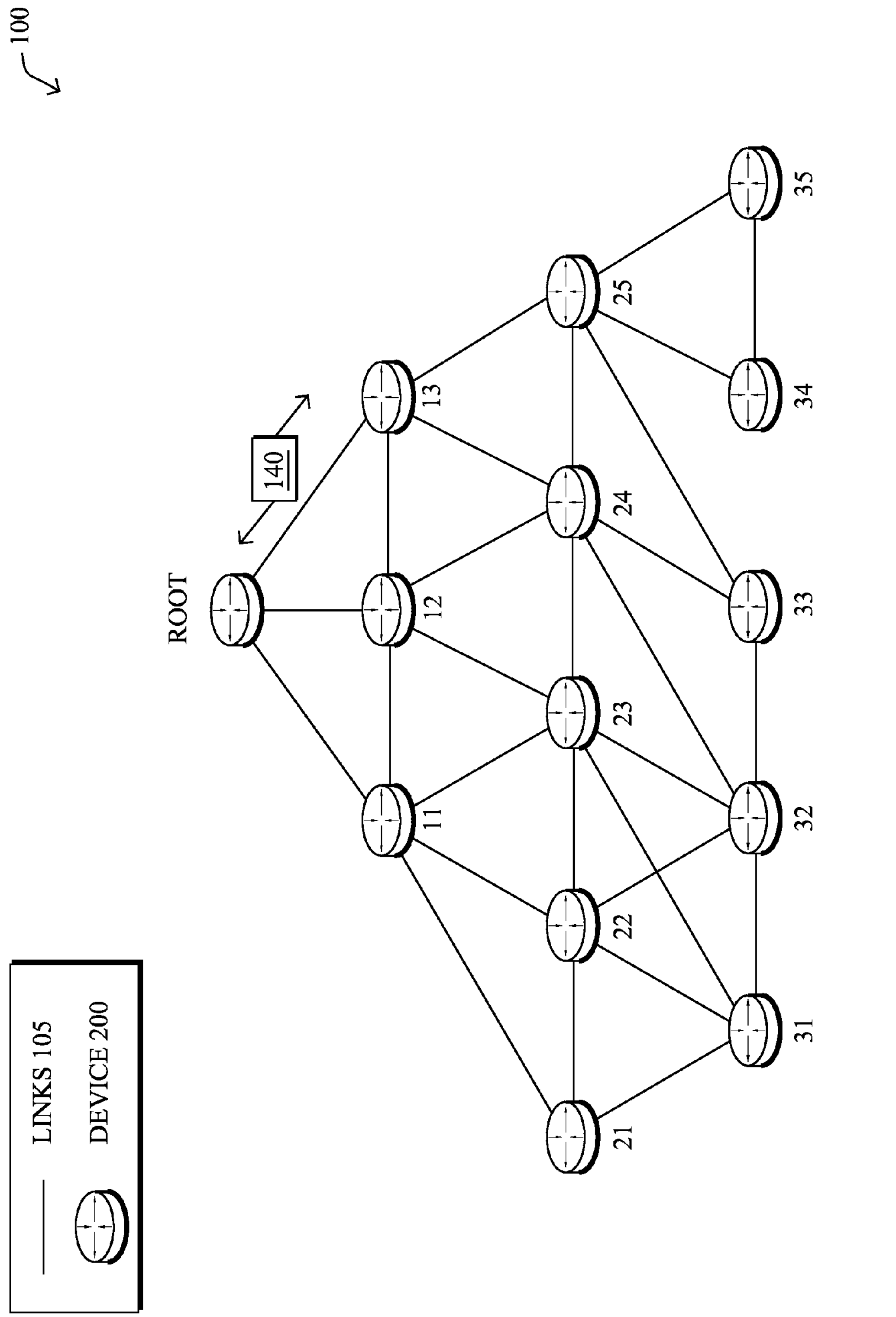
FIG. 1 illustrates an example communication network.

According to one or more embodiments of the disclosure, a node joins a communication network, and in response to joining the network, operates in a rapid startup mode, wherein the node in rapid startup mode establishes network configurations rapidly by deemphasizing quality (optimality) of the network configurations. Subsequent to operating in the rapid startup mode (e.g., after some timer or explicit command), the node then operates in a robust mode, wherein the node in robust mode iteratively refines the network configurations to increase the quality of the network configurations.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root", "11," "12," . . . "35", and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
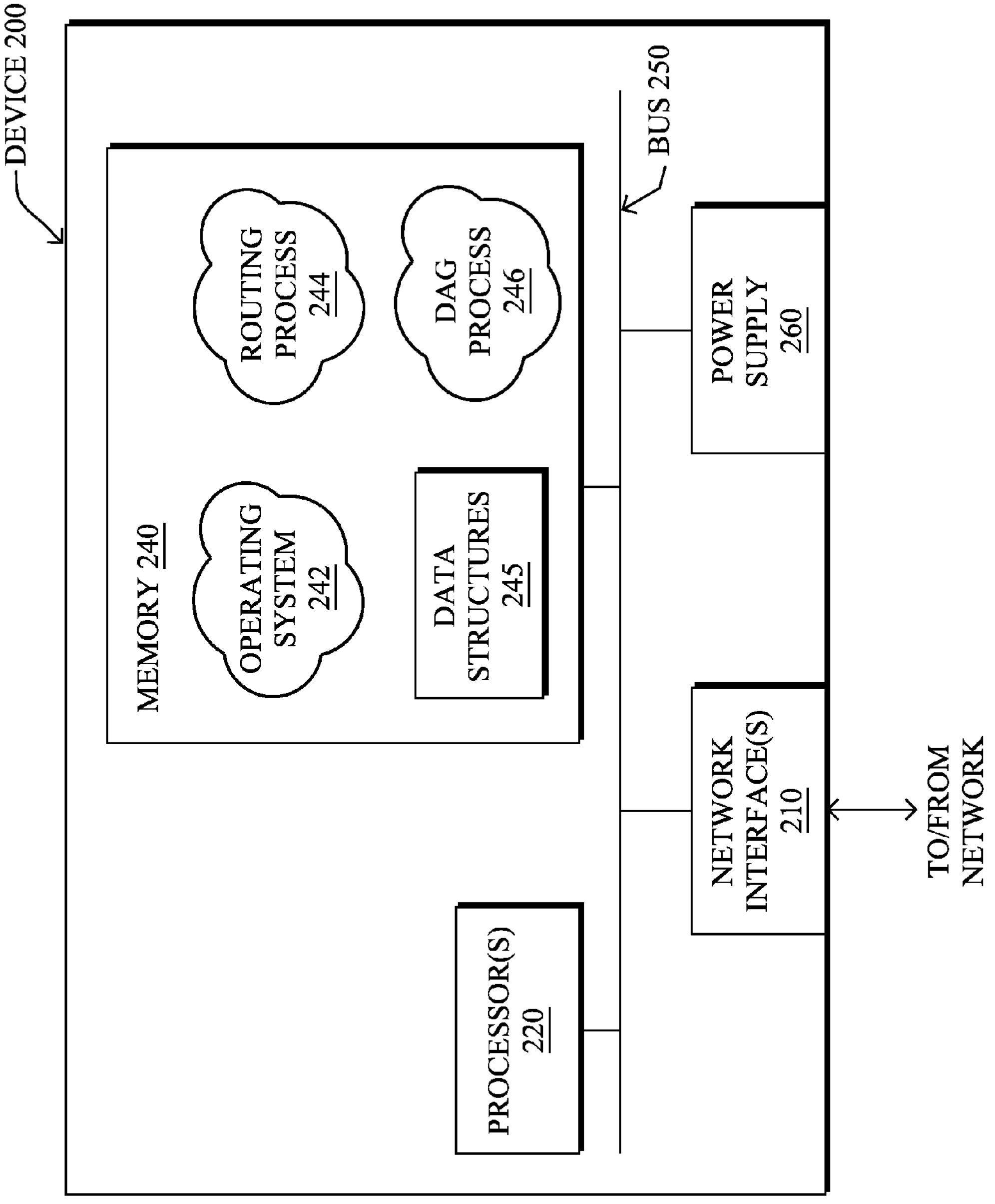
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a directed acyclic graph (DAG) process 246, as well as other various processes not explicitly shown, such as for applications, etc., operating on the device.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology- Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-11> by Thubert (May 5, 2011 version) and "The Minimum Rank Objective Function with Hysteresis"<draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
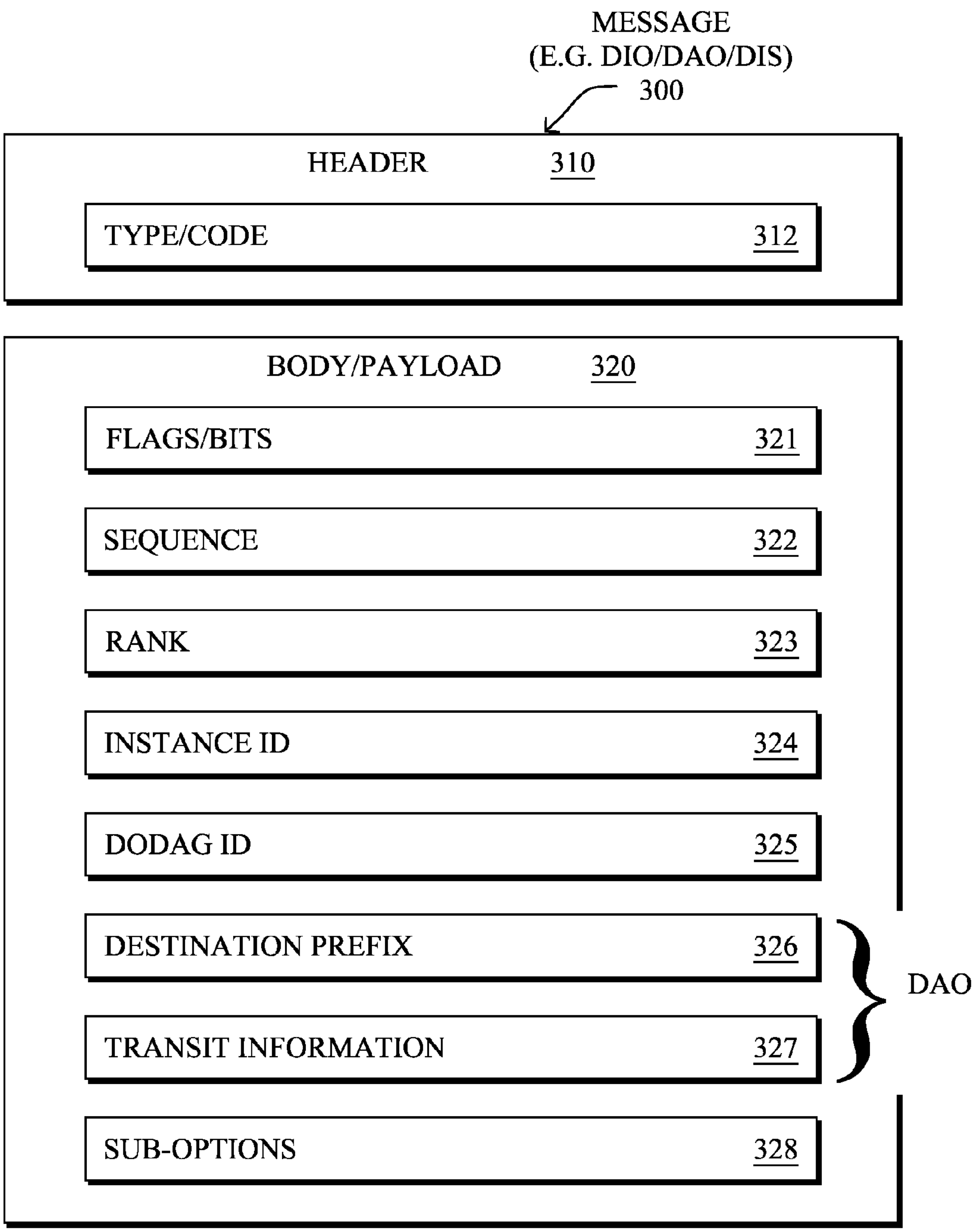
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
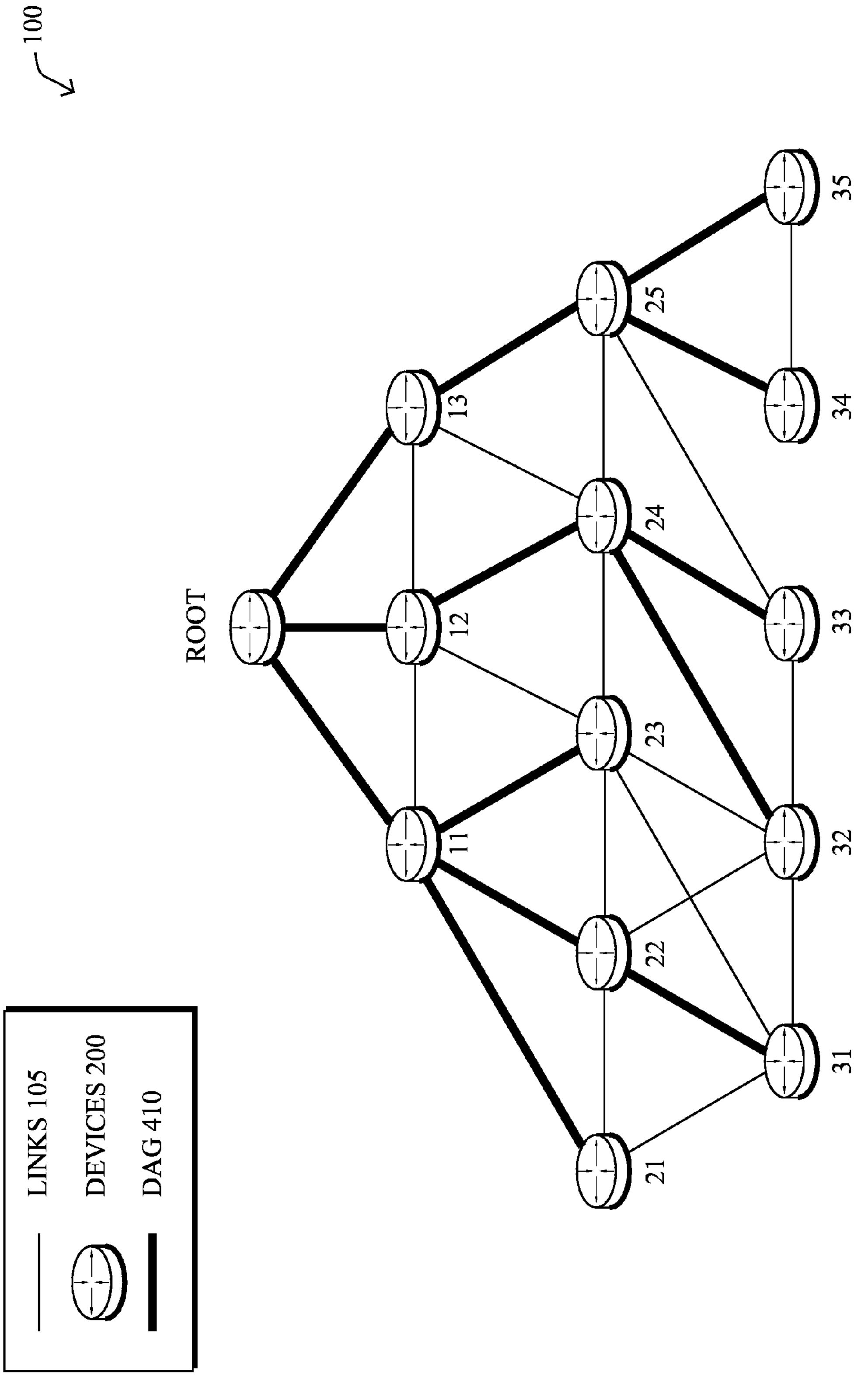
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that while a DAG 410 is shown, other types of routing instances may be used herein, as may be appreciated by those skilled in the art.

As noted above, one particularly cumbersome feature of certain LLNs today is their network formation time, both for cold-start and warm-start network formation scenarios. A cold-start network formation occurs the first time the network forms after being deployed in the field. In some deployment scenarios, this may occur over time or all at once. In the former, a Field Area Router (FAR) is deployed and enabled and devices are installed one-by-one. In the latter, the FAR is not deployed and enabled until all other LLN devices have been installed. In a warm-start, on the other hand, network formation occurs any subsequent time the deployed network forms. For example, a warm-start network formation may occur after power has been restored to an area that was previous experiencing a power outage event (thus leading to potentially a large number of nodes trying to rejoin the network after failure restoration). A warm-start network formation may also occur when replacing a failed FAR.

In either case, the network formation time is defined by the amount of time it takes for all LLN devices to begin communicating with necessary application end-points. To reach this final end goal, a typical LLN device must complete a number of steps:

1) Discover a personal area network or "PAN" (i.e., a specific network in IEEE 802.15.4 terminology);
2) Perform 802.1x-based mutual authentication and obtain link security keys (or other forms of authentication);
3) Discover a default route (e.g., by using RPL, which by itself involves a number of steps);
4) Configure a global IPv6 address (e.g. by using DHCPv6); and
5) Advertise the global IPv6 address to configure downward routes (e.g., by using RPL).

The ratio of LLN devices to FARs can typically be anywhere from 1000 to 5000 LLN devices for every FAR. As a result, each PAN will typically contain from 1000 to 5000 LLN devices. Furthermore, LLN deployments can be dense and LLN devices can easily have hundreds of neighbors. For these reasons, properly building a stable network topology can take tens of minutes, if not hours.

In particular, when discovering a PAN, LLN devices must be conservative in sending out beacon request messages to solicit beacons from neighboring devices. While an LLN device would like to send beacon request messages quickly, doing so can easily cause congestion as multiple devices send beacons in response. A similar issue occurs when attempting to discover a default route. For example, devices would like to quickly send RPL DIS messages to solicit DIO messages from neighboring routers. However, doing so can cause significant congestion by nodes sending DIO messages in response.

Also, when determining a set of default routes to use, LLN devices must make some estimation of the link quality. However, estimating the link quality in LLNs requires devices to generate messages so that it can observe and record the result of using that link. Generating more messages increases the number of observations and increases confidence in the link quality metrics, but doing so increases the amount of time before the link can be used for routing.

Furthermore, due to the sheer number and density of nodes, protocols that require a significant number of exchanges conservatively space out their transmissions to avoid congestion and contention. Avoiding congestion helps avoid packet drops that can further delay the process. But more importantly, avoiding congestion can help make more accurate link quality estimations. The primitive radios on LLN devices typically cannot tell the reason for a lost link-layer acknowledgment. For example, LLN radios typically cannot tell if a transmission failure is due to collisions from other transmissions or simple due to a low quality link.

In many cases, therefore, the amount of time to properly build a stable networking topology can be exceptionally extended, and often does not meet the requirements outlined by LLN customers.

Rapid Network Formation

The techniques herein introduce the concept of having a first mode that allows network formation to happen more quickly by trading off the quality of the network topology, use of long-term IPv6 addresses, etc. The quick formation mode ("rapid startup mode" herein) allows devices to begin communicating at the application layer more quickly, but across paths that may not be as stable or optimal, and with temporary IP addresses. After the quick formation, the network then moves into a state of iterative improvements ("robust mode" herein). This approach differs from conventional techniques that all perform the same network formation algorithms whether or not the network is first coming up or for iterative improvement. Note further that simply trying to aggressively reduce the time spent for each of the delay-inducing steps mentioned above, while still trying to optimize the network topology, would reduce the "convergence time" but comes with the high risk of introducing major instabilities. The techniques described herein thus provide for mechanisms to switch between modes that tradeoff network formation time and quality of the network topology being formed.

Specifically, according to one or more embodiments of the disclosure as described in detail below, when a node joins a communication network, it operates in a rapid startup mode, where the node in rapid startup mode establishes network configurations rapidly by deemphasizing quality (optimality) of the network configurations. Subsequent to operating in the rapid startup mode (e.g., after some timer or explicit command), the node then operates in a robust mode, wherein the node in robust mode iteratively refines the network configurations to increase the quality of the network configurations.

Illustratively, the techniques described herein may be performed by hardware, software, and/or firmware, such as in accordance with the routing process 244 and/or DAG process 246 as mentioned above, though extended to contain computer executable instructions executed by the processor 220 to perform functions relating to the novel techniques described herein. For example, the techniques herein may be treated as extensions to conventional protocols, such as the various routing protocols, RPL protocol, etc., and as such, may be processed by similar components understood in the art that execute those protocols, accordingly.

Generally speaking, an objective of this invention is to allow LLN devices to begin communicating at the application layer as quickly as possible. The techniques herein achieve this by extending the relevant protocols (e.g., PAN discovery, DHCP, RPL, etc.) to operate in a "rapid startup" mode that allows for quicker network formation, but does so by trading the quality of the formed network formation. Following the rapid startup mode, the network operates in a "robust" mode to iteratively refine the network using more robust (but also more time-consuming) techniques.

===PAN Discovery===

Figure 5:
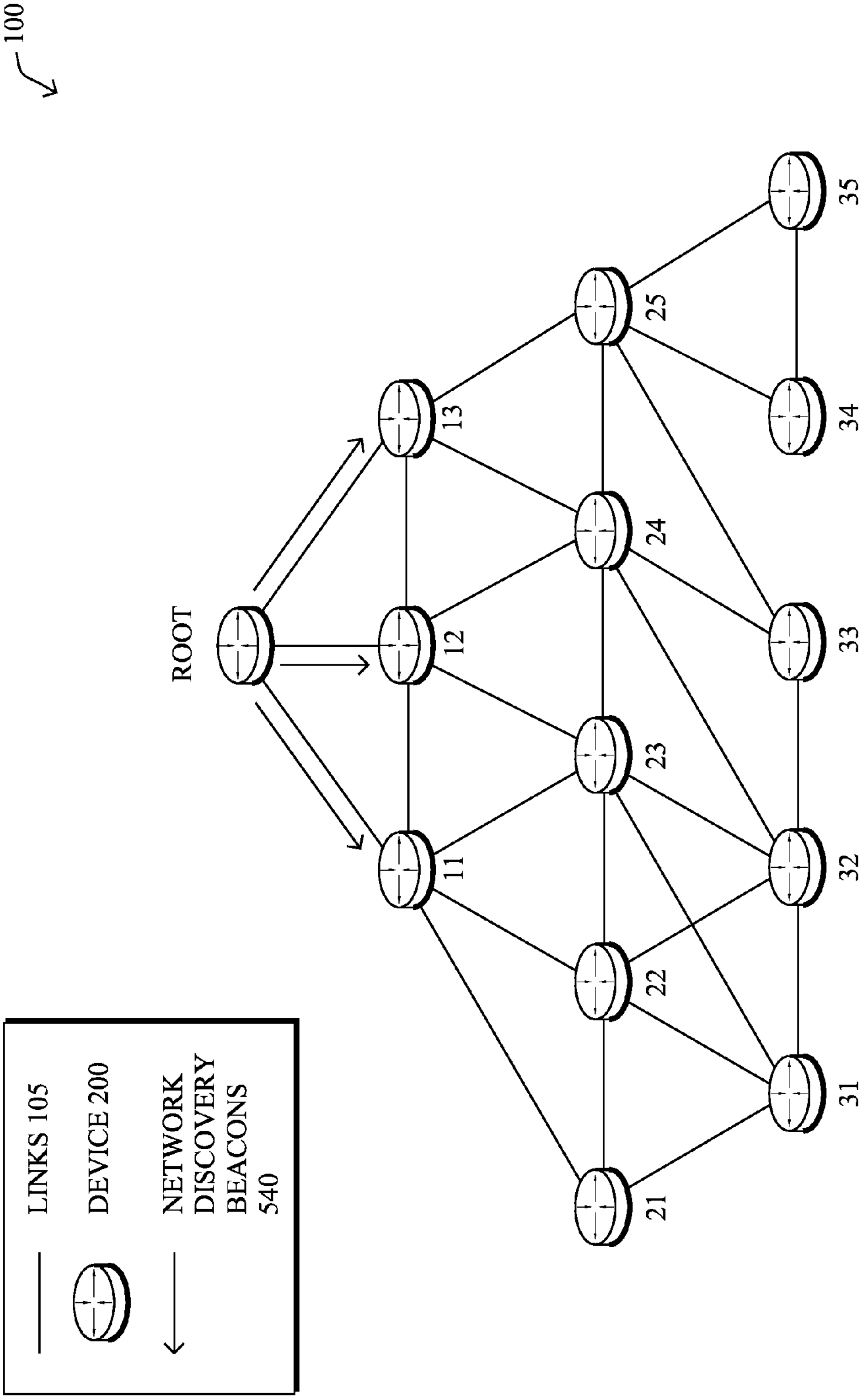
FIG. 5 illustrates an example exchange of network discovery beacons.

FIG. 5 illustrates an example of network discovery beacon transmission into the network (e.g., IEEE 802.15.4 Beacons). In particular, network discovery beacons 540 may be transmitted (e.g., broadcast) into the network by appropriate devices (e.g., the root device in the example) at a chosen frequency to announce the presence of a network (e.g., a PAN).

When operating in the rapid startup mode, devices transmit network discovery beacons at a higher frequency than during the robust mode. Doing so allows neighboring devices searching for a network (e.g., a PAN) to discover the network/PAN more quickly. Furthermore, it avoids the need for neighboring devices to transmit beacon requests (requesting that a network discovery beacon be transmitted), which can cause unneeded congestion especially when many devices are sending beacon requests within a short window. In another embodiment a searching mode may send a beacon request with a special flag, so that only a subset of nodes answer. That is, a discovery request message may be transmitted during the rapid startup mode to specify a subset of nodes to answer the request, as opposed to waiting for all potential nodes to reply, process all the responses, choose the best ones, etc.

When operating in robust mode, devices transmit the network discovery beacons more slowly (less frequently). By slowing the rate, the beacons consume less of the constrained channel capacity and reduces their effects on other mechanisms (e.g., link quality estimation) and application traffic.

===Routing===

Figure 6:
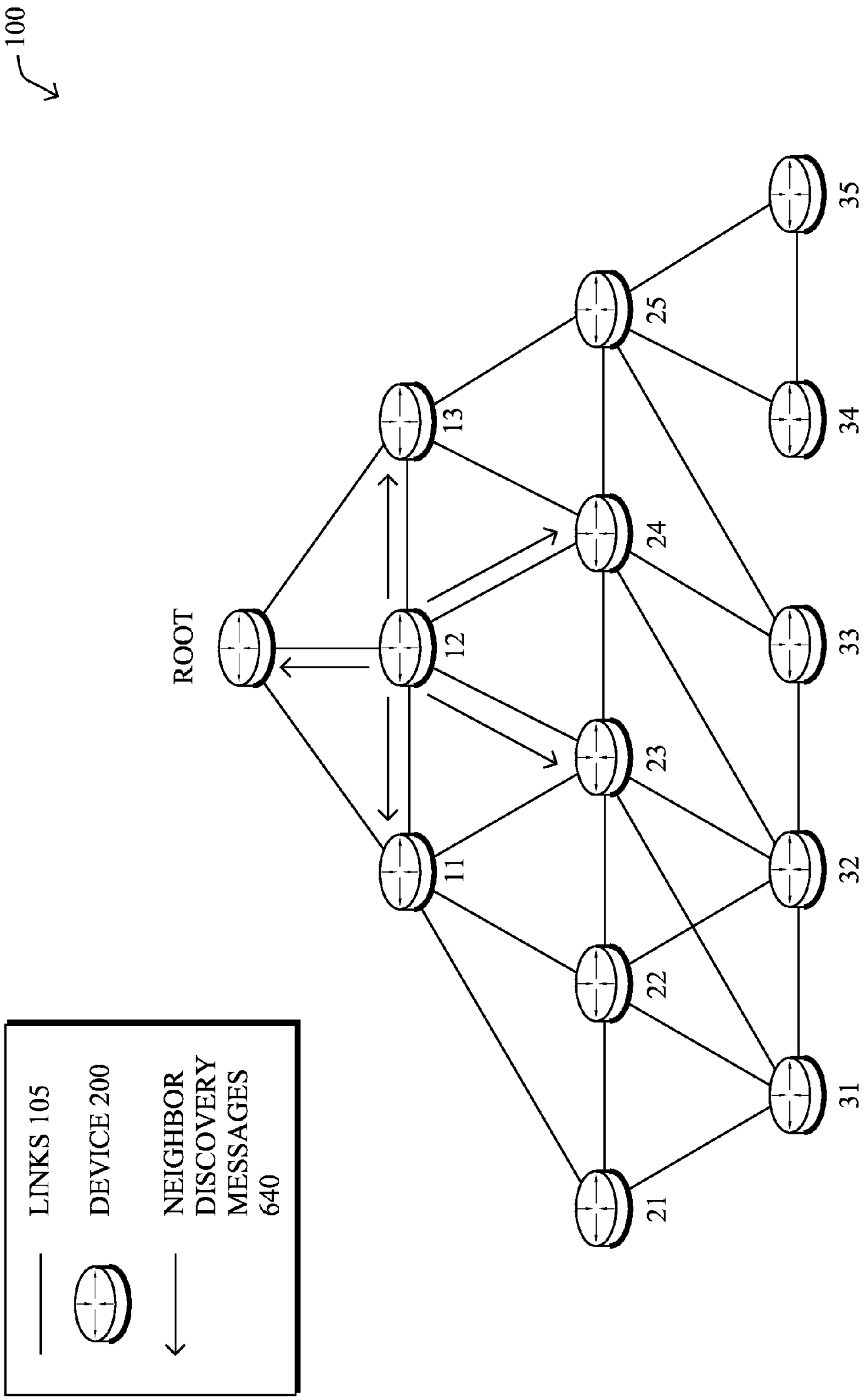
FIG. 6 illustrates an example exchange of neighbor discovery messages.

FIG. 6 illustrates an example of neighbor discovery message transmission into the network (e.g., DIO, DAO, and/or DIS messages 300). In particular, neighbor discovery messages 640 may be transmitted (e.g., broadcast) into the network by appropriate devices (e.g., node 12 in the example) at a chosen frequency. For example, network discovery messages may be used to request a response from a neighbor (e.g., a DIS message), to announce the node's presence in the network (e.g., a DIO message), or to advertise reachable routes in the network (e.g., a DAO message).

As with network/PAN discovery, when using RPL in rapid startup mode, devices transmit neighbor discovery messages (e.g., DIO and DAO messages) more frequently (i.e., at a higher frequency than during the robust mode). Transmitting DIO messages more frequently allows neighboring devices to discover neighboring routers more quickly and propagate routing information more quickly. Alternatively, the searching (joining) may send a DIS messages requesting replies from a few select neighbors. That is, the discovery request message noted above may also be applied to the DIS messages, such that a subset of nodes to answer the request is specified. Note that upon receiving the first DIO in reply to a DIS, that is, receiving an initiating neighbor discovery message from a particular neighbor node prior to any other neighbor discovery message, the particular neighbor node is immediately selected as the best next hop, thus not waiting for other replies to be received. In this manner, the node effectively joins a "non-optimized" DAG. Also, transmitting DAO messages more frequently allows devices to configure downward routes more quickly.

On the other hand, when operating in robust mode, devices transmit DIO and DAO messages less frequently. By slowing the rate, RPL control messages consume less of the constrained channel capacity and reduces their effects on other mechanisms (e.g., link quality estimation) and application traffic.

===Link Quality Estimation===

In rapid startup mode, link quality may be determined based on whatever metrics are available using a single transmission. In particular, such metrics include the Received Signal Strength Indicator (RSSI) and Link Quality Indicator (LQI). The former provides information on the power level of a received signal. The latter provides information on how easily the signal can be decoded by the radio. Both metrics are provided by most representative transceivers for LLNs. While RSSI and LQI are useful metrics, their usefulness is also limited. For example, RSSI can be affected by external interference and the measured energy is not necessarily that generated by the transmitter. While LQI is a more direct measure of the quality of a signal, it only makes measurements at the symbol level and not the packet level. Both RSSI and LQI can also have significant variance due to time-varying characteristics. The advantage, however, is that both RSSI and LQI can be obtained using a single transmission.

Figure 7A:
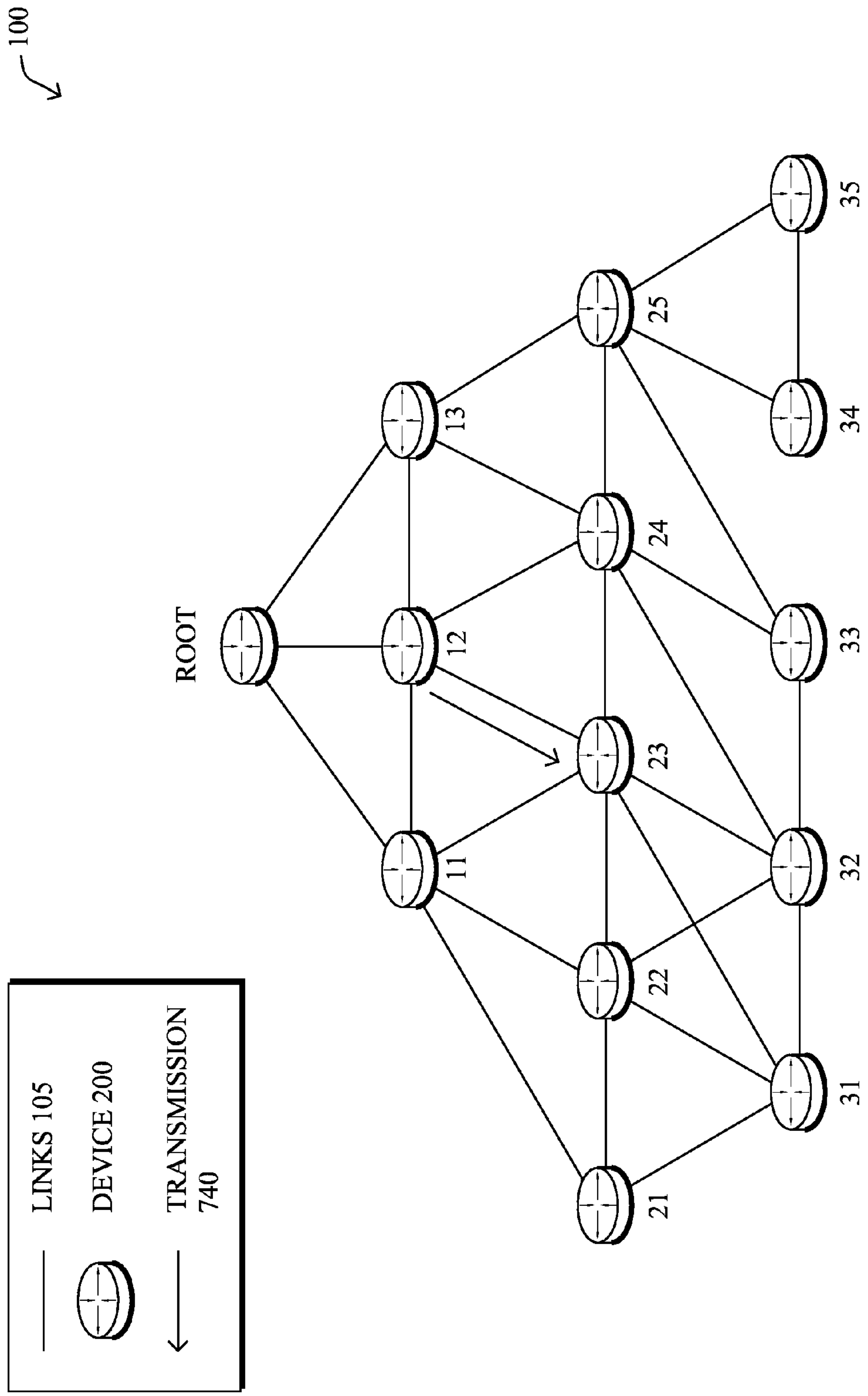
FIGS. 7A-7B illustrate examples of singular and plural transmissions.
Figure 7B:
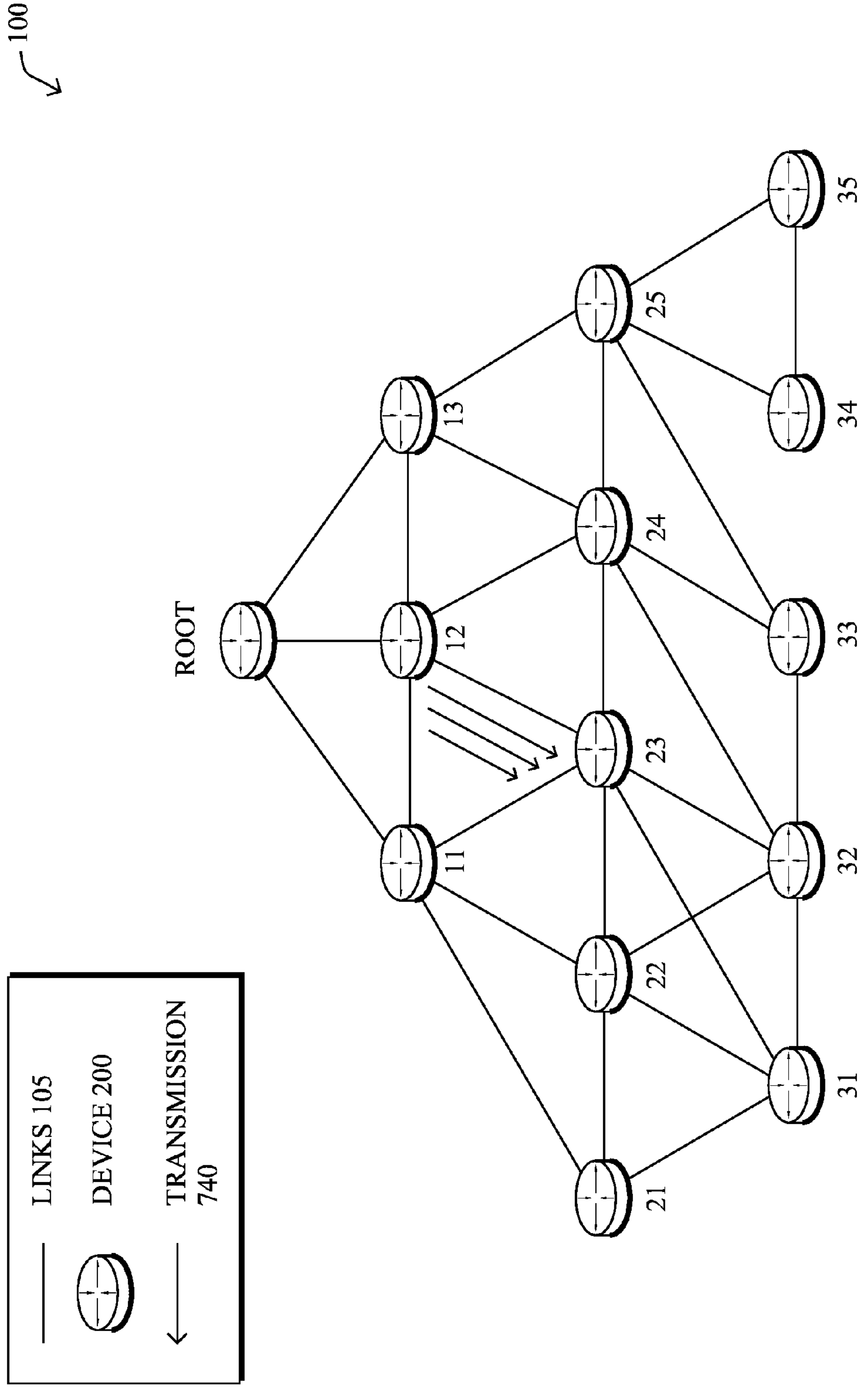

FIG. 7A illustrates a simplified example of a single transmission 740, as opposed to a plurality of transmissions over time as shown in FIG. 7B. In particular, as mentioned, a link quality estimation (e.g., RSSI, LQI, etc.) can be determined for one or more links of the node based on a single transmission during the rapid startup mode. Conversely, in robust mode as shown in FIG. 7B, measurements are taken over a number of transmissions over time. Doing so is necessary for metrics such as Estimated Transmission Count (ETX), where a number of transmission attempts must be made to have useful granularity when computing the ratio of transmission successes to total transmission attempts. Furthermore, taking multiple measurements and averaging them over a moving window allows a device to compute the variance and confidence intervals of such metrics.

===Address Autoconfiguration===

Figure 8A:
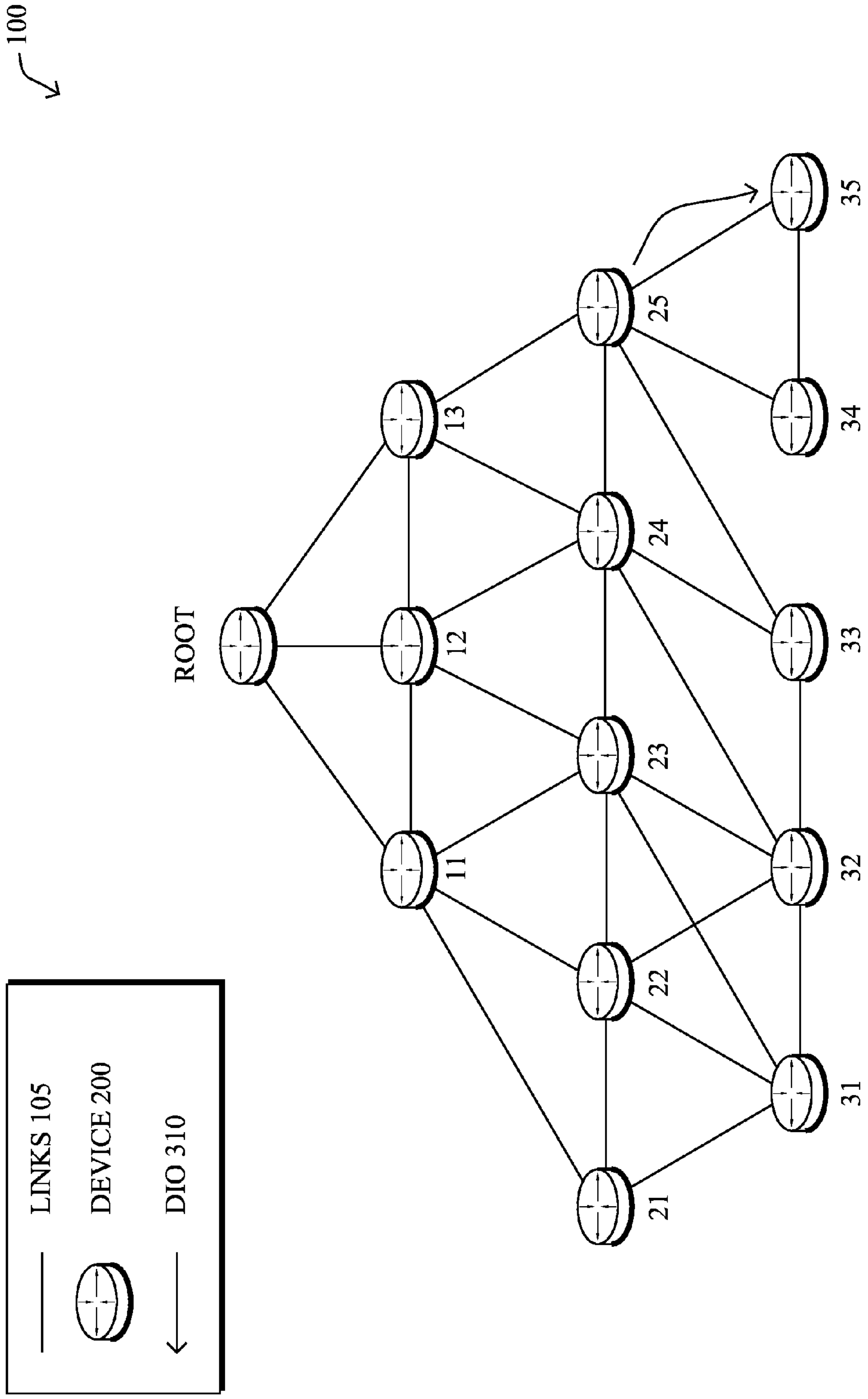
FIGS. 8A-8C illustrate examples of address autoconfiguration.
Figure 8B:
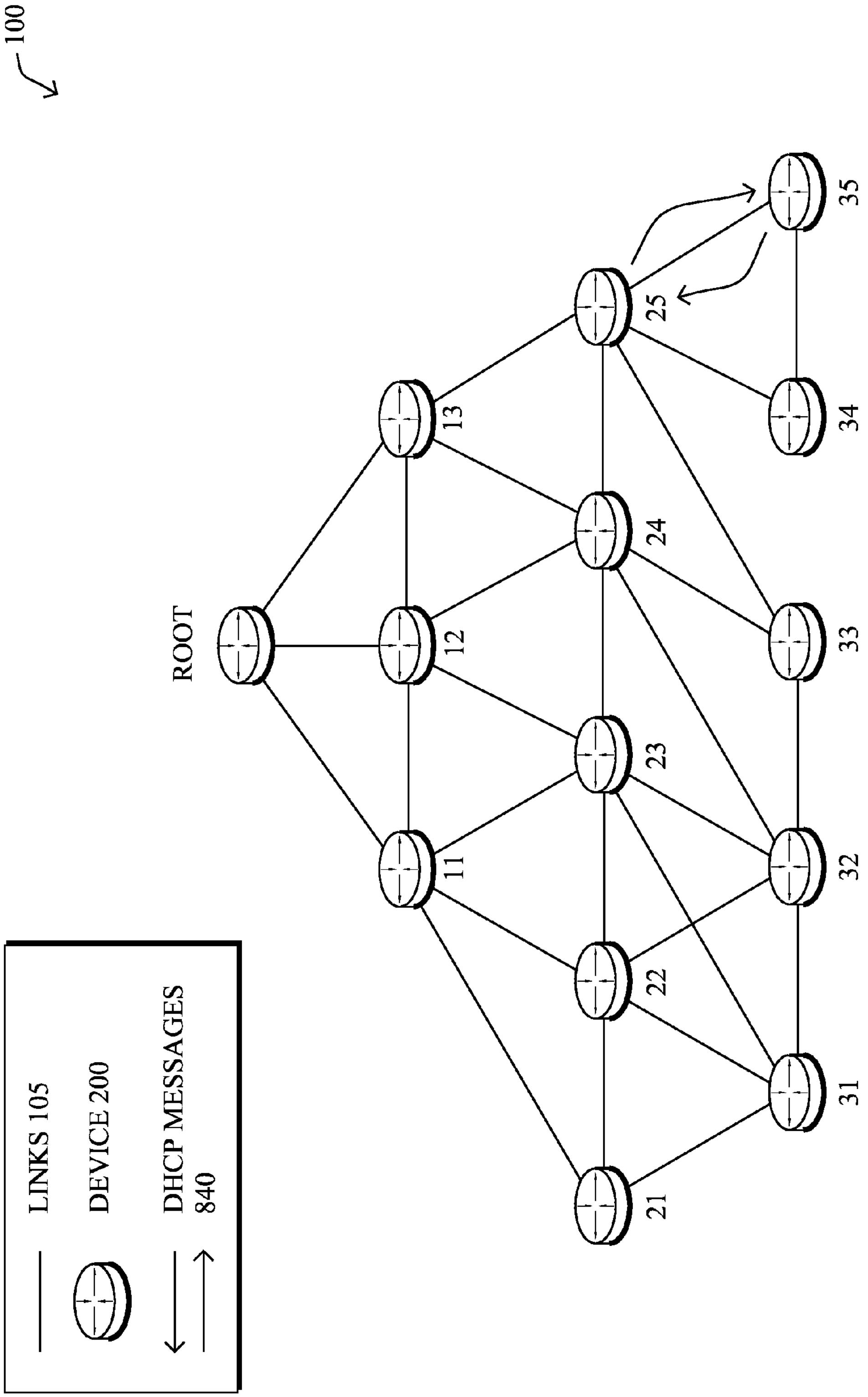

In rapid startup mode, address autoconfiguration can be performed in a number of ways. In one embodiment, a Stateless Address Autoconfiguration (SLAAC) technique may be used to configure global addresses. For example, devices may obtain the global prefix using a Prefix Information Option carried in RPL DIO messages, such as illustrated in FIG. 8A. Using SLAAC, devices need not request an address from a DHCP server. In another embodiment, a local dynamic host configuration protocol (DHCP) service may be used, where every node (router) can implement a DHCP server. In this embodiment, as shown in FIG. 8B, when joining a network, a device may perform DHCP Prefix Delegation (with request/response messages 840 being exchanged) to obtain a prefix from an immediate neighbor. By having each device host a DHCP server, devices do not need to communicate over multiple hops to obtain a global IPv6 address, thus reducing the time to get a routable IPv6 address. Note that the pool of addresses used by each node (when using DHCP on each node) could use a well-known set of addresses.

Figure 8C:
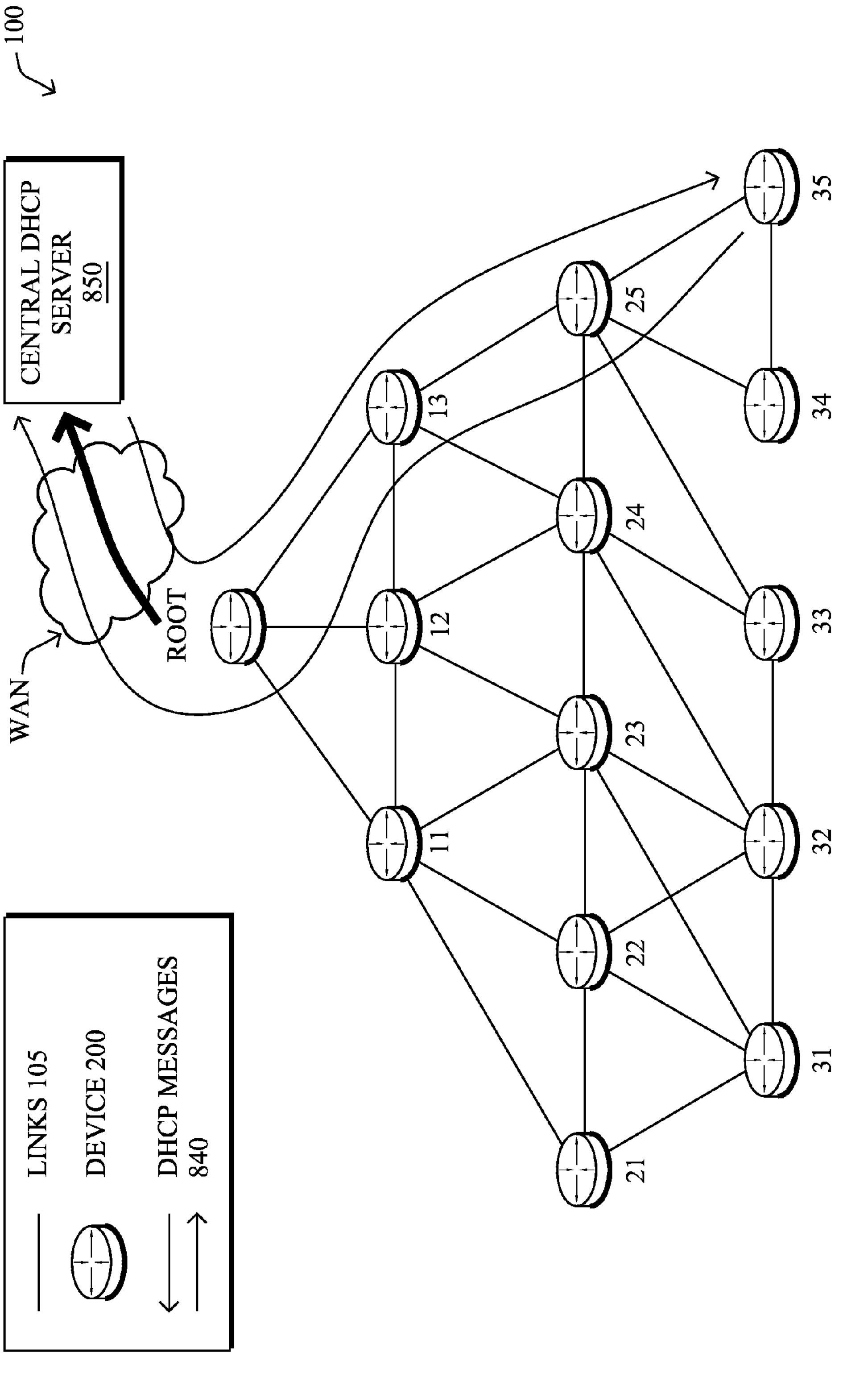

In robust mode, address autoconfiguration may be performed with a centralized DHCP service/server, which may illustratively be located in a backend datacenter, as shown in FIG. 8C (messages 840 between a device and a central DHCP server/datacenter 850). The advantage of assigning addresses using a central DHCP server is that it can better assign addresses, for example, those that are more effectively compressed by a protocol referred to as "6LoWPAN HC" as specified in the IETF Internet Draft, entitled "Compression Format for IPv6 Datagrams in Low Power and Lossy Networks (6LowPAN)"<draft-ietf-6lowpan-hc-15> by Hui et al. (Feb. 24, 2011 version). The centralized DHCP server may also assign addresses in a way that allows for better aggregation to promote smaller routing tables.

In yet another embodiment, should a global but temporary IPv6 address be assigned to a node during the rapid startup mode thanks to an immediate neighbor DHCP server, a "make before break" approach consisting of switching to the new IPv6 could take place during the transition to the robust mode, without any packet loss.

===Switching Between Rapid Startup and Robust Modes===

Various examples of "joining" a network may be understood in the art, such as powering on the node, learning of a new field area router (FAR) (e.g., root node), starting a new routing instance (e.g., a new DAG), updating to a new routing protocol, etc. Note that the rapid startup and robust modes may or may not be network-wide state. For instance, in one embodiment, all nodes in the network may initially operate in rapid startup mode for a set timer duration, or until an explicit command that indicates a switch to robust mode is propagated from the root. In another embodiment, however, a node independently initially operates in rapid startup mode for a fixed period of time after joining the network, then autonomously switches into robust mode.

Note also that the rapid startup mode and robust mode do not have to apply to all protocols operating on a node simultaneously, i.e., are per-protocol operating on the node. For example, address autoconfiguration may be in robust mode while neighbor discovery is still in rapid startup mode. In other words, a node's operating in either mode may be a complete operation of all protocols in that mode (i.e., all or nothing), while in an alternative embodiment, selective use of the modes may be made on a per-protocol basis (e.g., based on configuration, a speed at which each protocol's operation completes, such as obtaining an address quickly, then switching to robust mode for that protocol to obtain a better address in time).

Also, in some cases, the rapid startup mode and robust mode are mutually exclusive (e.g., when determining how often to send IEEE 802.15.4 beacons network wide, only one frequency can be chosen). In other cases, however, the rapid startup mode and robust mode can be operated at least partially in parallel. For example, when computing the link quality, the rapid startup mode can utilize RSSI and LQI, while in parallel generating more messages to build better characterizations of RSSI and LQI as well as the ETX metric in a robust mode operating in the background.

For instance, specific to RPL, an initial routing topology (routing instance) may be formed in rapid startup mode, and then refined in robust mode. Alternatively, RPL may form a quick routing topology and robust routing topology in parallel. The quick routing topology forms more quickly, but is inherently less stable, less optimized, and less robust but allows applications to begin communicating more quickly. The robust routing topology takes longer to form. In RPL, the quick and robust routing topologies may be represented using different instances, metrics, and/or Objective Functions.

Figure 9A:
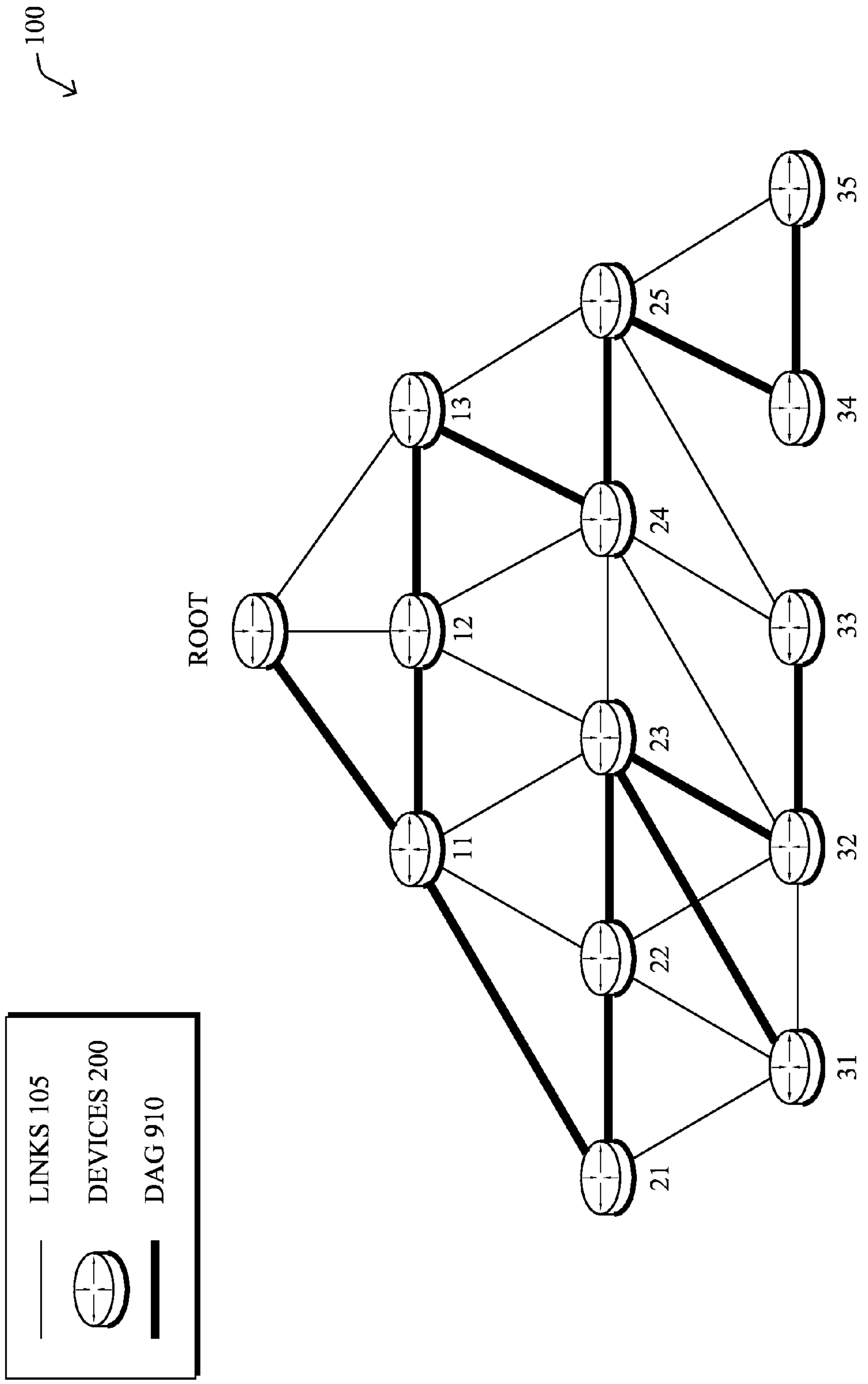
FIGS. 9A-9B illustrate an example of network refinement.
Figure 9B:
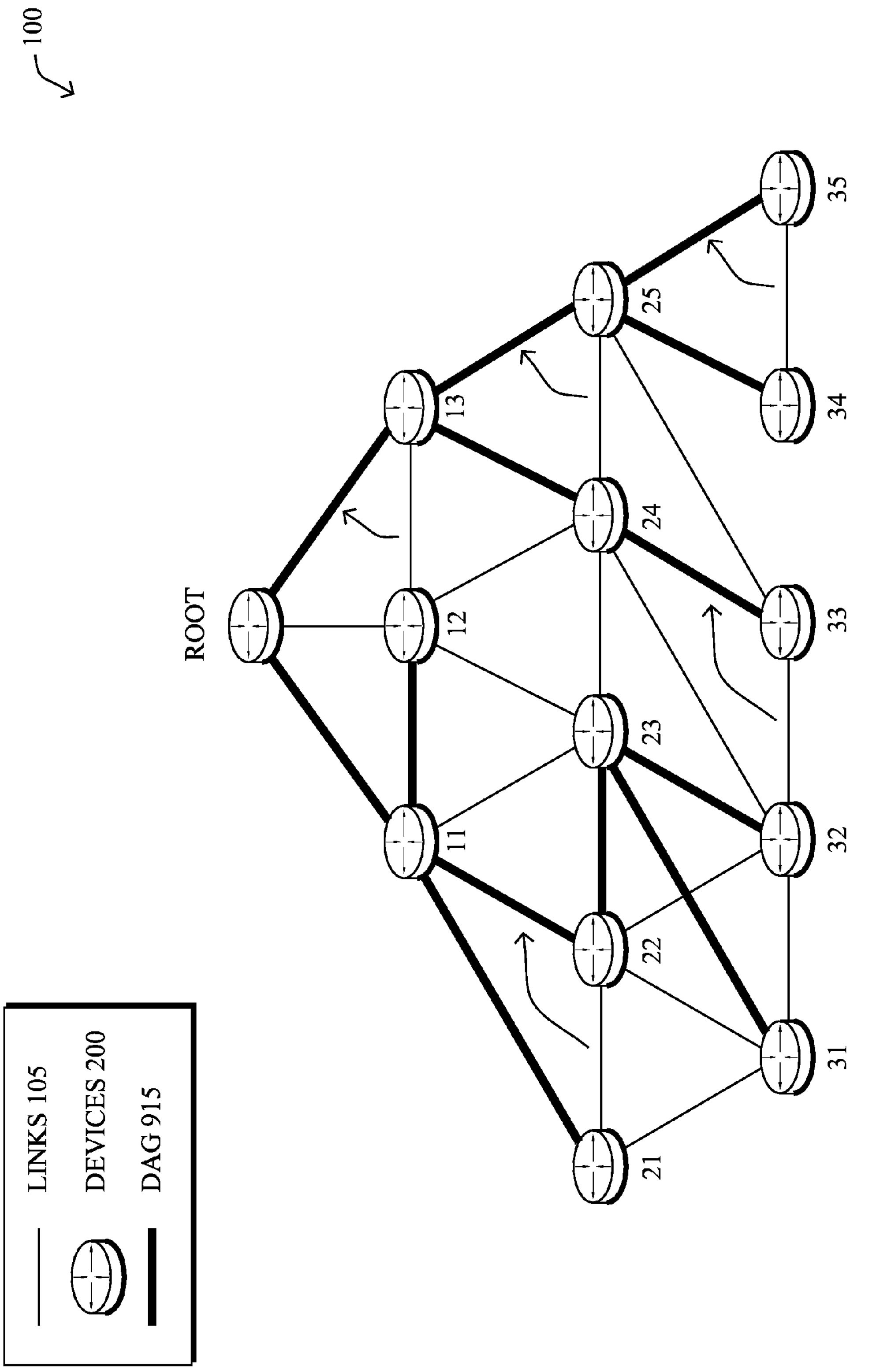

FIGS. 9A and 9B illustrate an example of how a quick routing topology (e.g., DAG 910 of FIG. 9A) can first be created using the rapid startup mode, and then (or in parallel) a more robust topology (e.g., DAG 915 of FIG. 9B) can be created over time. Note that the first instance 910 of the topology may not be the most efficient or stable, and that the second, iteratively refined instance 915 may be more efficient, more stable, etc. (The DAG 410 in FIG. 4 above may be considered another refinement in the topology that may occur over time from FIG. 9B.) Note also that when the topologies are created in parallel, the node may manage the topologies (e.g., routing instances or DAGs) by keeping the quick/rapid topology (first instance) 910 active, thus routing based thereon, while the robust topology (second instance) 915 is being built based on the robust mode, i.e., in the background during operating in the rapid startup mode.

Figure 10:
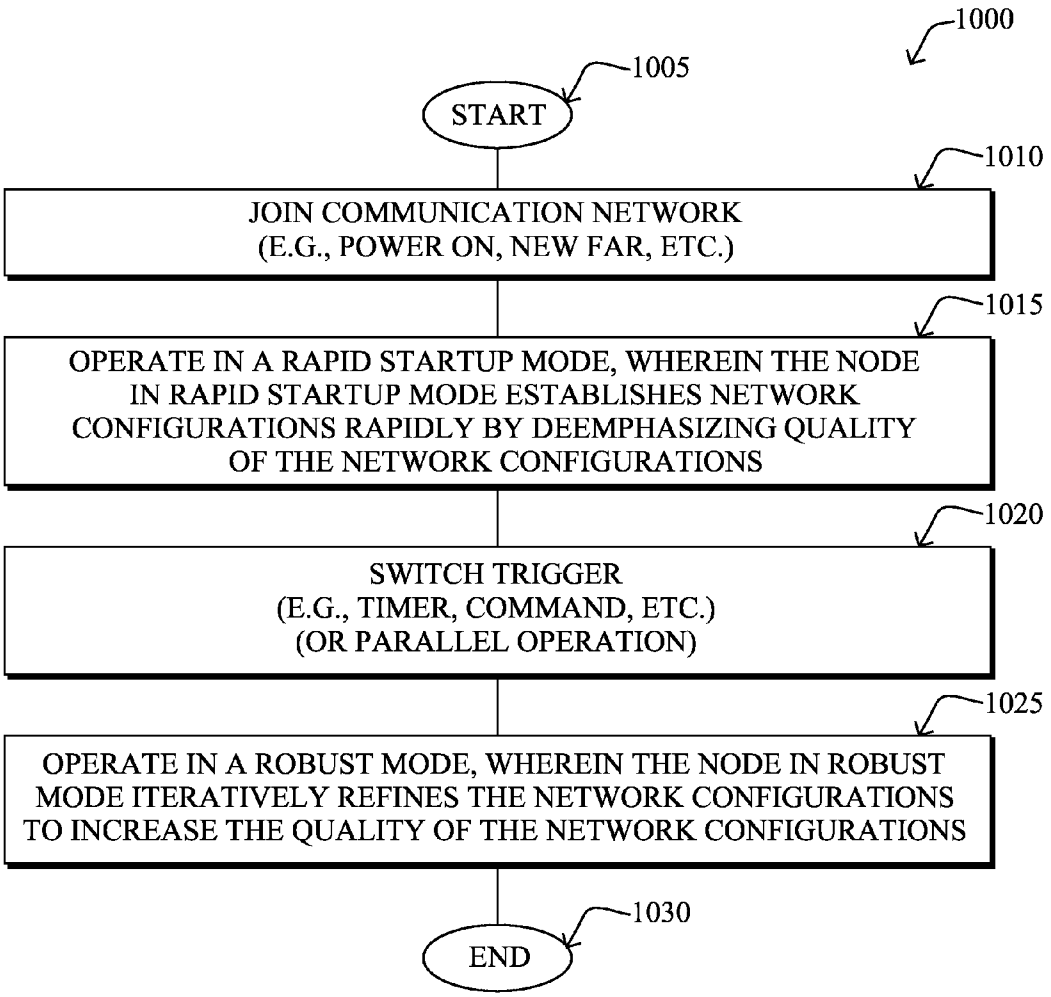
FIG. 10 illustrates an example simplified procedure for providing rapid network formation for LLNs.

FIG. 10 illustrates an example simplified procedure for providing rapid network formation for LLNs in accordance with one or more embodiments described herein. The procedure 1000 starts at step 1005, and continues to step 1010, where, as described in greater detail above, a node joins a communication network. In particular, as mentioned above, the node itself may have just powered on, a new FAR may have been discovered, or other cold-start or warm-start conditions may be present, accordingly. In response to joining the network, in step 1015 the node operates in a rapid startup mode, where the node in rapid startup mode establishes network configurations rapidly by deemphasizing quality of the network configurations as noted above. For example, network discovery beacons 540 and/or neighbor discovery messages 640 may be transmitted at a higher-than-normal frequency. Other rapid startup mode operations may also take place in step 1015, such as quickly selecting best next hops, quickly determining link quality estimates, and autoconfiguring addresses, etc.

In step 1020, in response to a trigger to switch modes, such as expiration of a timer, an explicit command, etc., as described above, then in step 1025 the node may begin operating in the robust mode to iteratively refine the network configurations to increase their quality, accordingly. For example, as pointed out above, example refinements may involve transmitting beacons 540 and other discovery messages 640 at a slower (or normal) pace, or using more transmissions 740 to determine link quality estimations. Also, address autoconfiguration may be based on a centralized DHCP service 850. In this manner, the quickly established network in step 1015 above (e.g., an example shown in FIG. 9A) may be adjusted dynamically to optimize communication (e.g., as shown in FIG. 9B and FIG. 4).

Notably, in accordance with one or more embodiments herein, step 1020 may allow for parallel operation of the modes in step 1015 and 1025. For example, an active routing instance (e.g., DAG 910) may be quickly established according to the rapid startup mode and utilized for forwarding traffic, while an updated routing instance (e.g., DAG 915) is built in the background according to the robust mode of operation until the network is ready to make the switch to the new routing instance and operate solely in the robust mode.

The procedure 1000 ends in step 1030. It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for rapid network formation for LLNs. In particular, the techniques herein initially operate the network in a first mode that allows for quick network formation followed by a subsequent mode that allows for more robust network formation, thus introducing the concept of a two-step network formation. Illustratively, as detailed above, this is achieved by modifying relevant protocols (e.g., IEEE 802.15.4 PAN discovery, DHCPv6, RPL, link estimation, etc.) to support both rapid and robust modes, and by initially operating in rapid startup mode when first joining a network then switching (without traffic disruption) to robust mode after some time/trigger. A system in accordance with the techniques herein, therefore, allows for faster network formation times by sacrificing stability, optimality, and robustness during the initial period, allowing the network to refine itself at a later time, e.g., optimizing the network once the LLN nodes are at least communicating with end points over non-optimal paths.

While there have been shown and described illustrative embodiments that provide for rapid network formation for LLNs, it is to be understood that various other adaptations and modifications may be made within the spirit and scope of the embodiments herein. For example, the embodiments have been shown and described herein with specific relation to LLN networks. However, the embodiments in their broader sense are not as limited, and may, in fact, be used with other types of networks that may benefit from the techniques herein or their own respective reasons. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
joining a communication network by a node;
in response to joining the network, operating the node in a rapid startup mode, wherein the node in rapid startup mode establishes network configurations rapidly by deemphasizing quality of the network configurations; and
subsequent to operating in the rapid startup mode, operating the node in a robust mode, wherein the node in robust mode iteratively refines the network configurations to increase the quality of the network configurations.

2. The method as in claim 1, wherein joining comprises one of either powering on the node, or learning of a new field area router (FAR).

3. The method as in claim 1, further comprising:
switching from the rapid startup mode to the robust mode in response to one of either a timer or an explicit command.

4. The method as in claim 1, wherein operating in the rapid startup mode and the robust mode are per-protocol operating on the node.

5. The method as in claim 1, wherein operating in the rapid startup mode and the robust mode occurs at least partially in parallel.

6. The method as in claim 5, further comprising:
managing a first and second routing instance at the node, the first instance being an active instance operating according to the rapid startup mode, and the second instance being built based on the robust mode during operating in the rapid startup mode.

7. The method as in claim 1, further comprising:
transmitting network discovery beacons at a first frequency during the rapid startup mode that is higher than a second frequency during the robust mode.

8. The method as in claim 1, further comprising:
transmitting neighbor discovery messages at a first frequency during the rapid startup mode that is higher than a second frequency during the robust mode.

9. The method as in claim 8, further comprising:
receiving an initiating neighbor discovery message from a particular neighbor node prior to any other neighbor discovery message; and
selecting a best next hop as the particular node during the rapid startup mode.

10. The method as in claim 1, further comprising:
determining a link quality estimation for one or more links of the node based on a single transmission during the rapid startup mode; and
determining the link quality estimation for the one or more links based on a plurality of transmissions during the robust mode.

11. The method as in claim 1, further comprising:
transmitting a discovery request message during the rapid startup mode, the discovery request message specifying a subset of nodes to answer the request.

12. The method as in claim 1, further comprising:
performing address autoconfiguration for the node during the rapid startup mode using a stateless address autoconfiguration (SLAAC) technique; and
performing address autoconfiguration for the node during the robust mode using a centralized dynamic host configuration protocol (DHCP) service.

13. The method as in claim 1, further comprising:
performing address autoconfiguration for the node during the rapid startup mode using a local dynamic host configuration protocol (DHCP) service on each node in the network; and
performing address autoconfiguration for the node during the robust mode using a centralized DHCP service.

14. An apparatus, comprising:
one or more network interfaces to communicate in a communication network;
a processor coupled to the network interfaces and adapted to execute one or more processes; and
a memory configured to store a process executable by the processor, the process when executed operable to:
join the communication network as a node;
in response to joining the network, operate the node in a rapid startup mode, wherein the node in rapid startup mode establishes network configurations rapidly by deemphasizing quality of the network configurations; and
subsequent to operating in the rapid startup mode, operate the node in a robust mode, wherein the node in robust mode iteratively refines the network configurations to increase the quality of the network configurations.

15. The apparatus as in claim 14, wherein the process when executed is further operable to operate in the rapid startup mode and the robust mode at least partially in parallel.

16. The apparatus as in claim 14, wherein the process when executed is further operable to:

transmit network discovery beacons at a first frequency during the rapid startup mode that is higher than a second frequency during the robust mode.

17. The apparatus as in claim 14, wherein the process when executed is further operable to:

transmit neighbor discovery messages at a first frequency during the rapid startup mode that is higher than a second frequency during the robust mode;

receive an initiating neighbor discovery message from a particular neighbor node prior to any other neighbor discovery message; and select a best next hop as the particular node during the rapid startup mode.

18. The apparatus as in claim 14, wherein the process when executed is further operable to:

determine a link quality estimation for one or more links of the node based on a single transmission during the rapid startup mode; and determine the link quality estimation for the one or more links based on a plurality of transmissions during the robust mode.

19. The apparatus as in claim 14, wherein the process when executed is further operable to:

perform address autoconfiguration for the node during the rapid startup mode using a technique selected from one of either a stateless address autoconfiguration (SLAAC) technique or a local dynamic host configuration protocol (DHCP) service on each node in the network; and perform address autoconfiguration for the node during the robust mode using a centralized DHCP service.

20. A tangible, non-transitory, computer-readable media having software encoded thereon, the software when executed by a processor on a node operable to:

join the communication network;

in response to joining the network, operate the node in a rapid startup mode, wherein the node in rapid startup mode establishes network configurations rapidly by deemphasizing quality of the network configurations; and subsequent to operating in the rapid startup mode, operate the node in a robust mode, wherein the node in robust mode iteratively refines the network configurations to increase the quality of the network configurations.

21. The computer-readable media as in claim 20, wherein the software when executed is further operable to operate in the rapid startup mode and the robust mode at least partially in parallel.

22. The computer-readable media as in claim 20, wherein the software when executed is further operable to:

transmit network discovery beacons at a first frequency during the rapid startup mode that is higher than a second frequency during the robust mode.

23. The computer-readable media as in claim 20, wherein the software when executed is further operable to:

transmit neighbor discovery messages at a first frequency during the rapid startup mode that is higher than a second frequency during the robust mode;

receive an initiating neighbor discovery message from a particular neighbor node prior to any other neighbor discovery message; and select a best next hop as the particular node during the rapid startup mode.

24. The computer-readable media as in claim 20, wherein the software when executed is further operable to:

determine a link quality estimation for one or more links of the node based on a single transmission during the rapid startup mode; and determine the link quality estimation for the one or more links based on a plurality of transmissions during the robust mode.

25. The computer-readable media as in claim 20, wherein the software when executed is further operable to:

perform address autoconfiguration for the node during the rapid startup mode using a technique selected from one of either a stateless address autoconfiguration (SLAAC) technique or a local dynamic host configuration protocol (DHCP) service on each node in the network; and performing address autoconfiguration for the node during the robust mode using a centralized DHCP service.

* * * * *